Oct. 11, 1955

G. H. FUEHRER 2,720,401

DRILL STEEL RETAINER

Filed July 14, 1953

GEORGE H. FUEHRER
INVENTOR.

BY

ATTORNEY

Oct. 11, 1955
G. H. FUEHRER
2,720,401
DRILL STEEL RETAINER
Filed July 14, 1953
2 Sheets-Sheet 2
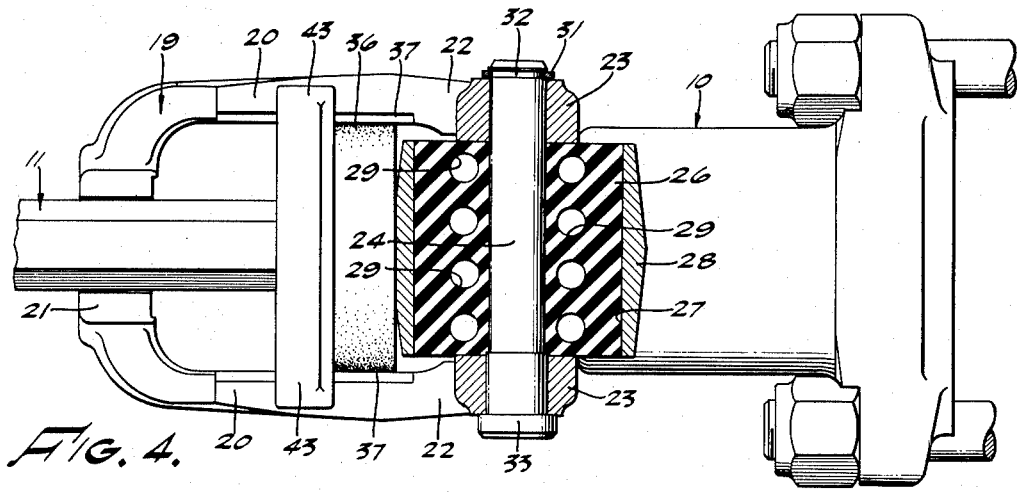
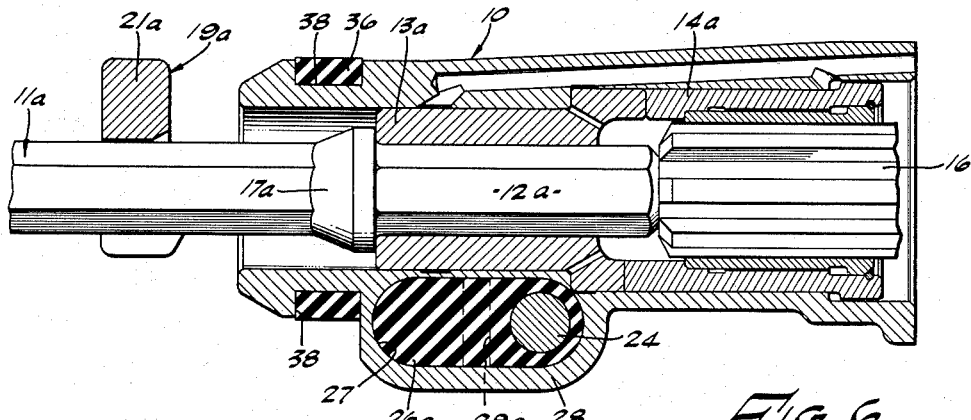
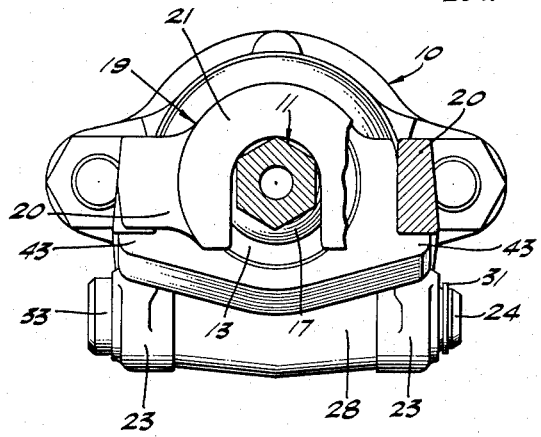
GEORGE H. FUEHRER
INVENTOR.
BY
ATTORNEY

United States Patent Office 2,720,401
Patented Oct. 11, 1955

2,720,401

DRILL STEEL RETAINER

George H. Fuehrer, Downey, Calif., assignor to Thor Power Tool Company, Aurora, Ill., a corporation of Delaware Application July 14, 1953, Serial No. 367,954

15 Claims. (Cl. 279—19.1)

This invention relates to a drill steel retainer, and particularly to a retainer mechanism embodying a combination detent and vibration absorbing means.

It is well known that drill steel retainers, that is to say the means provided on sinker type rock drills for holding the drill steel in position and for pulling the drill steel out of the hole after it is bored, are the cause of a large proportion of the maintenance problems associated with pneumatic rock drilling apparatus. The steel retainer must be able to withstand the impact of the steel, resist the effects of extreme vibration, and be relatively impervious to the abrasive and wearing effects of muck and sand. One particularly destructive use of a drill steel retainer is in the pulling of a drill steel after it has become jammed or wedged in a hole. When this occurs, the operator not only pulls on the drill but operates the hammer apparatus, so that the collar of the drill steel is literally hammered by the steel retainer to vibrate the steel out of the hole. In spite of the extreme abuse and wear which a steel retainer must be designed to withstand, it must also be designed to present only a slight resistance to manual manipulation during substitution of a new drill steel for a worn or broken one.

In attempting to design drill steel retainers capable of withstanding extreme abuse of the type above indicated, prior inventors have resorted to mounting resilient bushings around the pivot pin for the retainer yoke, and have provided spring-type detent mechanisms adjacent the junction of the yoke and pivot pin in order to maintain the retainer in operative position except during changing of the steel. Such detent mechanisms, because of their springs and their rubbing metallic surfaces, were subject to frequent failure and breakage. Furthermore, such detent mechanisms served only to maintain the yoke in position, and performed no function in aiding the resilient bushing to absorb and eliminate vibration.

In view of the above factors characteristic of the field of drill steel retainers, it is an object of the present invention to provide a drill steel retainer mechanism embodying a single resilient element constructed and mounted to act both as a detent in holding the retainer yoke in operative position, and to act as a damping means for preventing wear and breakage of the retainer and drill due to vibration effects.

Another object of the invention is to provide a combination detent and vibration absorbing means located relatively close to the point of engagement of the drill steel with the retainer yoke, and adapted to be readily shifted to numerous operative positions to cancel out the effects of wear.

An additional object of the invention is to provide a drill steel retainer embodying a resilient bushing around the pivot pin for the retainer yoke, the mounting arrangement for the bushing being such that the bushing and retainer may be adapted for operation with drill steels having shanks of varying lengths.

These and other objects and advantages of the invention are more fully set forth in the following specification and claims considered in connection with attached drawings to which they relate.

In the drawings:

Figure 4 is a horizontal sectional view along line 4—4 of Figure 1 and looking upwardly from the bottom of the drill;

Figure 2:
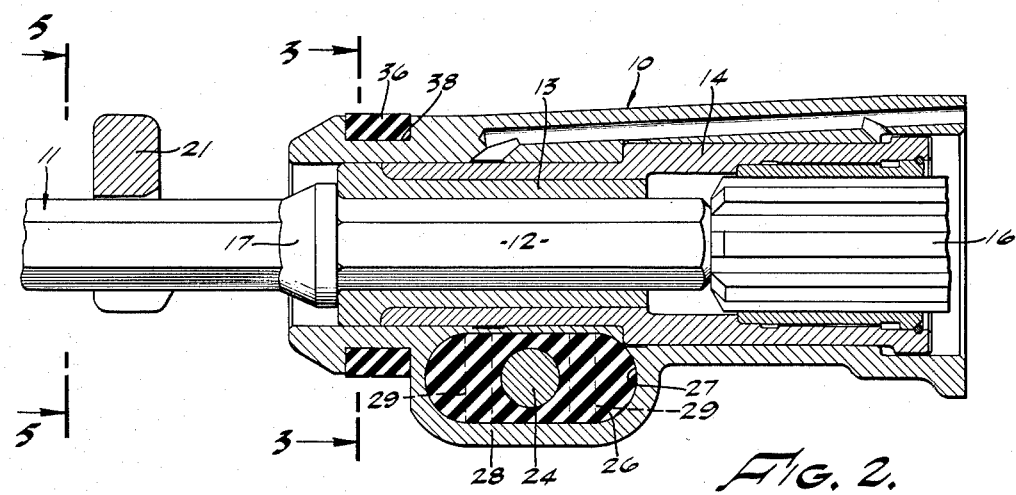
Figure 2 is a longitudinal central section of the showing of Figure 1.

Figure 5 is a sectional view along line 5—5 of Figure 2, with portions of the retainer yoke being broken away to illustrate the stop means which cooperate with the detent in maintaining the yoke in its steel holding position; and Figure 6 is a longitudinal central section of a second embodiment of the invention, showing the resilient bushing employed when the drill is used with a drill steel having a shorter shank than that illustrated in Figure 2.

Referring to the drawings, and particularly to the form of the invention illustrated in Figures 1 through 5, the invention is illustrated as embodied in a sinker type rock drill, not shown, having a generally cylindrical fronthead 10 adapted to receive a collared drill steel 11 of the hexagonal type. As illustrated in Figure 2, the shank 12 of drill steel 11 is mounted axially of a chuck 13 which in turn is mounted within a chuck driver 14. The chuck 13 and chuck driver 14 perform the function of transmitting the rotation of piston hammer stem 16, which is associated with suitable ratchet and rifle bar mechanisms, not shown, to drill steel shank 12 and thus to the unshown cutting bit. Drill steel 11 is not only rotated, but is percussed by piston stem 16 to result in a combined rotary and percussive engagement of the cutting bit with the rock face to be bored. During the drilling operation, and also after the drill action is stopped and it is desired to withdraw the steel from the hole, it is necessary to limit the travel of steel collar 17 away from chuck 13 in order to hold the steel in position within the drill. It is to the means for accomplishing this result, conventionally referred to as a drill steel retainer, that the present invention is directed.

The steel retainer comprises a generally U-shaped yoke 19 having substantially parallel arms 20 which extend forwardly along opposite sides of fronthead 10 and merge into a generally lunate base portion 21, the latter fitting over drill steel 11 forwardly of its collar 17. The base 21, and the adjacent portions of the arms 20, lie in a horizontal plane containing the axis of drill steel 11 and fronthead 10, but the rear portions of the arms curve downwardly, as indicated at 22, and terminate in relatively thick apertured end portions 23 adapted to receive a horizontal pivot pin 24. It will be observed that the arrangement of these elements is such that the yoke 19 may pivot upwardly, from the solid to the dashed line position shown in Figure 1, in order to remove the yoke base 21 from the path of collar 17 and thus permit withdrawal of the steel from the drilling apparatus. On the other hand, when yoke 19 is pivoted downwardly from its "releasing" to its "holding" position, the open bottomed yoke base 21 fits around drill steel 11 and is adapted to be engaged by collar 17 to limit the movement of drill steel 11 longitudinally of the drill.

As recited above, the engagement between drill steel collar 17 and retainer yoke 19 subjects the latter to serious vibration and abuse which is aggravated by the presence of muck and other foreign matter at the drill head. To aid in damping or absorbing the vibration while preventing the ingress of muck, etc., into the pivotal mounting for the retainer yoke 19, the mounting pin 24 is supported in a resilient bushing or cushion 26, which is mounted in a transverse opening 27 through a curved boss portion 28 at the underside of fronthead 10. In the embodiment of the invention illustrated in Figures 1 through 5, the pin 24 is mounted axially of bushing 26 which is of oblong section and is highly effective in absorbing vibrational stresses in all directions. The resilience of the cushion, and thus its effectiveness in absorbing vibration, is increased by providing a plurality of vertical openings 29 (Figures 2 and 4) longitudinally of pin 24 and forwardly and rearwardly thereof.

In assembling the elements of the drill steel retainer thus far described, the cushion 26 is first forced into opening 27, after which yoke 19 is positioned so that its apertured end portions 23 are registered with the axial bore or opening in the cushion. Pivot pin 24 is then press fitted through end portions 23 and cushion 26, the mounting being such that pin 24 turns with yoke 19 in cushion 26 which acts as a journal. The arrangement by which pin 24 turns with the yoke, instead of serving as a pivotal mounting for it, is highly advantageous in that the abrasive effects of the muck and dirt are reduced to a minimum. As a safety measure, in order to insure against disassembly of the retainer during operation and thus vibration of the drilling apparatus, a spring lock ring 31 (Figure 4) is provided in an annular groove 32 at one end of pin 24, the other end of the pin being provided with a head 33 which cooperates with ring 31 in preventing the pin from shifting axially.

Figure 1:
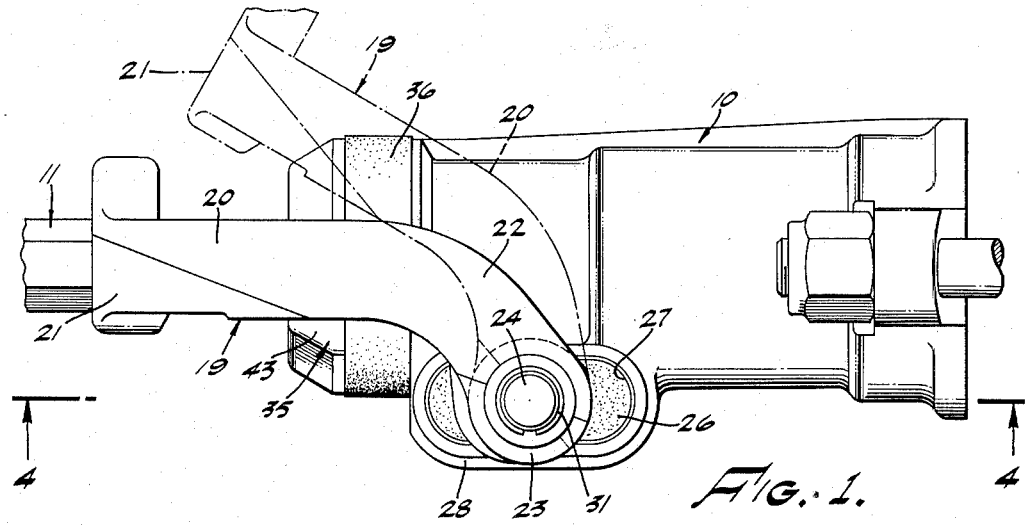
Figure 1 is a side elevational view of the fronthead of a sinker type rock drill, and showing the retainer in both its drill steel holding and releasing positions.

Although the cushion 26 is effective to absorb the vibration transmitted to pin 24 from yoke 19, and is also operative to resist, somewhat, the pivoting of yoke 19 between the solid and dashed line positions illustrated in Figure 1, the cushion is not alone sufficient to absorb all destructive vibration and insure maintenance of yoke 19 in operative position during the drilling action. Accordingly, the invention provides combination detent and vibration absorbing means 35 disposed on the forward end of fronthead 10 and generally between pin 24 and base portion 21 of the steel retainer. The means 35 comprise a resilient element 36 adapted to be resiliently engaged by correspondingly located protuberances or projections 37 on yoke arms 20. More specifically, the resilient element 36 is an elastomeric ring having a rectangular section and mounted in an annular groove 38 at the forward end of fronthead 10, and the protuberances 37 are integral with arms 20 and are formed with generally concave surfaces 39 (Figure 3) which are concentric with ring 36 and have the same radius as its cylindrical outer surface. The construction and mounting of the ring 36 and projections 37 is such that the metallic portions of fronthead 10 adjacent the ring are never engaged by the projections, the sole engagement being between the projections and ring.

Figure 3:
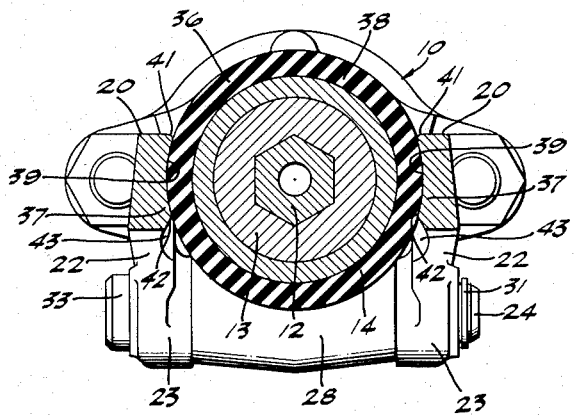
Figure 3 is a vertical transverse section taken along line 3—3 of Figure 2 and looking toward the backhead of the drill.

Referring to Figure 3, it will be noted that when the yoke 19 is in its operative or steel holding position, the concave surfaces 39 are in close flatwise engagement with ring 36. It follows that the upper and lower ridges or edges 41 and 42 of protuberances 37 lie on opposite sides of a horizontal plane passing through the axis of drill steel 12, above and parallel to the pivot pin 24. The upper ridges 41 tend to prevent downward pivot of yoke 19, while lower ridges 42 tend to prevent its upward pivot, since the horizontal distance between corresponding ridges is less than the outer diameter of ring 36. It is, however, possible to pivot the yoke 19 upwardly to its drill steel releasing position, shown in dashed lines in Figure 1, merely by applying sufficient upward force to cause the lower ridges 42 to depress and ride upwardly over the center portion of ring 36. Upon the return or downward pivoting movement of yoke 19, the ridges 42 ride downwardly over ring 36 to again place the yoke in drill steel retaining position, with excessive downward pivoting of yoke 19 being prevented by stop ears 43 (Figures 1, 4 and 5) formed integral with fronthead 10 forwardly of the ring.

Preferably, both the ring 36 and the bushing 26 are formed of an elastomer having the desired properties of wear, abrasion resistance and continued elasticity under all temperature conditions. Neoprene has been found to be highly satisfactory in all respects, and is preferably employed for both of the resilient elements. However, even when the ring 36 is formed of neoprene its outer surface tends to wear as the result of the continued suffing action of the ridges 42 as yoke 19 is pivoted between its holding and releasing positions. Such wear, however, may be offset merely by turning the ring 36, about its center axis and along groove 38, until an unworn portion of its periphery is adjacent the protuberances 37. After all portions of the ring have become worn, it may be easily replaced merely by pulling it out of groove 38 and substituting a fresh one. The ring 36 thus provides a cheap, long lasting, and readily mounted detent and vibration absorbing element which requires no springs and is not affected by muck.

In the operation of the drill steel retainer, let it be assumed that yoke 19 is initially in the releasing position illustrated in dashed lines in Figure 1. The operator may then insert a drill steel 11 merely by placing its shank 12 in chuck 13 until collar 17 engages the forward chuck end. Yoke 19 is then manually pivoted to its operative position, shown in solid lines in Figure 1, sufficient pressure being applied to cause detent ridges 42 to ride downwardly over the center portion of ring 36 to provide a locking action preventing undesired upward pivot of the yoke. Upon subsequent percussion of drill steel 11 and consequent extreme vibration of the associated elements, particularly when the drill steel is being withdrawn from a hole and the collar 17 is in vibrating engagement with base portion 21 of the yoke, the vibration of the yoke will be absorbed partly by the ring 36 and partly by the bushing 26 for pivot pin 24. More specifically, the ring 36 engages yoke arms 20 to lessen the tendency of the yoke to pivot about a vertical axis, while the bushing 26 absorbs the forward and reverse vibrational forces transmitted from the yoke to its pivot pin 24. During the drilling action, the upper detent ridges 41 and stop ears 43 prevent downward pivot of yoke 19 from the desired position relative to drill steel 11, while detent ridges 42 prevent any tendency of yoke 19 to pivot upwardly to release the drill steel and consequently throw the operator off balance. It is emphasized that the detent action provided between ring 36 and protuberances 37 is much more effective than a detent action provided at the ends 23 of yoke arms 20, since the torque provided by a given force at yoke base 21 is much less at ring 36 than at pin 24.

Referring next to Figure 6, there is shown an embodiment of the invention illustrating how the apparatus may be adapted for use with drill steels having relatively short shanks, without altering the construction of fronthead 10 or the spacing between yoke portion 21 and the front end of the chuck. The components shown in Figure 6 which are identical with those of Figure 2 have been given the same reference numerals, while similar but modified components have been given the same reference numerals but followed by the letter "a". It will be noted that the shank 12a of drill steel 11a, Figure 6, is substantially shorter than the shank 12 of drill steel 11 shown in Figure 2. To receive the shank 12a, the chuck 13a and chuck driver 14a of the apparatus have been modified, but fronthead 10 and piston stem 16 are the same as in the embodiment shown in Figure 2. Since the chuck 13a is shorter than chuck 13, so that collar 17a of drill steel 11a is inserted a substantial distance in fronthead 10 when the drill steel is in its rearmost position, the pivot point for the yoke must be shifted rearwardly. The yoke base portion 21a will then be substantially closer to fronthead 10, thereby limiting movement of collar 17a between the chuck and the yoke to the same distance as in the embodiment of Figure 2.

In the Figure 6 form of the invention, the rearward shifting of yoke 19 is effected by substituting a resilient bushing 26a for the bushing 26, the bushing 26a having its transverse aperture located at its rearmost portion instead of at its axis as in the case of bushing 26. The pivot pin 24 is thus shifted rearwardly a substantial distance, yet the bushing 26a is operative to absorb extreme vibrations such as occur when the drill is operated during withdrawal of the drill steel from a hole. To increase the resilience of the bushing, vertical apertures 29a, corresponding in function to the apertures 29 illustrated in Figures 2 and 4, are provided centrally of bushing 26a. In addition to the substitution of bushing 26a for bushing 26, a yoke 19a having its protuberances more closely adjacent base portion 21a is substituted for the yoke 19 of Figure 2, in order to properly register the protuberances with resilient ring 36. This latter modification is advantageous in that it locates the detent point even more closely adjacent the steel striking point to further increase the effectiveness of the detent action.

The operation of the embodiment illustrated in Figure 6 is substantially the same as previously described operation of the embodiment shown in Figures 1 through 5.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A drill steel retainer for use on the fronthead of a pneumatic rock drilling apparatus, which comprises a yoke shaped to retain the drill steel of said apparatus in operative position, means to pivotally connect said yoke to said fronthead for pivotal movement of said yoke from a drill steel retaining position to a releasing position permitting removal of said drill steel, and means operative when said yoke is in said retaining position to resiliently associate said yoke and fronthead at a point remote from said pivotal connection means, said last-named means including a protuberance on an arm of said yoke and an elastomeric element mounted on said fronthead, said protuberance being adapted to lock over said elastomeric element when said yoke is pivoted to said retaining position.

2. A drill steel retainer for use on the fronthead of a drilling apparatus, which comprises a pivot member mounted on said fronthead and generally transversely thereof, the mounting for said pivot member being spaced a substantial distance rearwardly of the forward end portion of said fronthead, a generally U-shaped retainer yoke having a base adapted to fit over and retain a drill steel in operative position generally axially of said fronthead, the arms of said yoke extending adjacent opposite sides of said forward end portion of said fronthead and being connected to said pivot member for pivoting of said yoke from a drill steel retaining position to a releasing position permitting removal of said drill steel, resilient means mounted on said forward end portion of said fronthead inwardly adjacent said arms, and detent means provided on said arms and positioned to ride over said resilient means when said yoke is pivoted to said retaining position, said detent means being adapted first to shift said resilient means radially inwardly and then to permit return radially outward movement of said resilient means to a position tending to prevent pivoting of said yoke to releasing position.

3. The invention as claimed in claim 2, wherein said resilient means is an elastomeric ring mounted circumferentially of said fronthead, and said detent means are protuberances of the inner portions of said arms.

4. The invention as claimed in claim 3, wherein an elastomeric bushing is provided around said pivot member, said bushing cooperating with said elastomeric ring in damping the vibration of said yoke.

5. The invention as claimed in claim 2, wherein stop means are provided on said fronthead to prevent said yoke from pivoting from said retaining position in a direction other than toward said releasing position.

6. In a pneumatic rock drilling apparatus having an elongated casing and a drill steel projecting from the forward end of said casing for engagement with the rock face to be drilled, an elastomeric band mounted peripherally of the forward portion of said casing on the outer surface thereof, and a relatively strong and rigid retaining member movably mounted on said casing and adapted when in one position to retain said drill steel in said casing and when in second position to permit removal of said drill steel from said casing, said retaining member being lockingly associated with said band when in said one position and serving to provide a combination detent and vibration absorbing action.

7. The invention as claimed in claim 6, wherein said band is mounted in a peripheral groove in said casing and is adapted to be shifted in said groove in the event of wear and abrasion of the outer portion of said band.

8. The invention as claimed in claim 6, wherein said band is formed of neoprene.

9. In a rock drilling apparatus having a generally cylindrical casing adapted at its forward end to receive the shank of a drill steel, an elastomeric ring mounted peripherally of said forward casing end, and a yoke pivotally connected to said casing for rotation about an axis disposed rearwardly of said ring and perpendicular to said casing, said yoke having arms extending on opposite sides of said casing and joined by a base portion shaped to fit over said drill steel to retain the same in position, said arms being shaped for locking engagement with said ring when said yoke is pivoted to steel retaining position.

10. The invention as claimed in claim 9, wherein said arms are each provided with a protuberance adapted to engage said ring.

11. The invention as claimed in claim 10, wherein the distance between the protuberance on one of said arms and the protuberance on the other of said arms is slightly less than the outer diameter of said ring, and said protuberances are adapted, as said yoke is pivoted to steel retaining position, first to engage said ring on one side of a plane containing the axis of said ring and parallel to said yoke axis, next to deform said ring and ride thereover to the other side of said plane, and finally to permit said ring to resume its original section and thereby hold said protuberances in position for prevention of return pivoting of said yoke.

12. The invention as claimed in claim 9, wherein said ring has a cylindrical peripheral surface, and said protuberances are formed with concave faces having substantially the same radius as said surface and concentric therewith when said yoke is in steel retaining position.

13. The invention as claimed in claim 9, wherein the pivotal connection between said yoke and casing comprises an elastomeric bushing provided in an opening in a transverse boss on said casing, and a pivot pin mounted through said bushing and connected at its ends to the ends of said yoke arms.

14. The invention as claimed in claim 13, wherein said opening in said boss is of elongated section, and is adapted to receive bushings constructed to receive said pivot pin at various forward and rear locations.

15. In a percussion apparatus having an elongated casing and an elongated tool projecting forwardly from the forward end of said casing for engagement with the substance to be percussed, a relatively thick elastomeric band mounted peripherally of the forward end of said casing and in a plane transverse to the axis of said casing, and a generally U-shaped retaining yoke having its arm ends pivotally connected to opposite sides of said casing at points substantially rearward of said band, the base of said retaining yoke being disposed and shaped to engage said tool forwardly of said casing and to hold said tool in said casing when said yoke is in a first pivoted position but to permit withdrawal of said tool from said casing when said yoke is in a second pivoted position, the mid-portions of the arms of said yoke being disposed and shaped to lock with said band and provide a detent action resisting pivoting of said yoke when the latter is in said first pivoted position.

References Cited in the file of this patent

UNITED STATES PATENTS

| | | |
|---|---|---|
| 988,029 | Prellwitz | Mar. 28, 1911 |
| 1,646,773 | Slater | Oct. 25, 1927 |
| 1,680,644 | Shaff | Aug. 14, 1928 |
| 1,962,790 | Slater | June 12, 1934 |
| 2,114,047 | Curtis | Apr. 12, 1938 |
| 2,122,516 | Curtis | July 5, 1938 |